United States Patent
Coddington et al.

(10) Patent No.: US 12,276,548 B2
(45) Date of Patent: Apr. 15, 2025

(54) APPARATUS AND METHOD FOR DUAL COMB SPECTROSCOPY

(71) Applicant: Government of the United States of America, as represented by the Secretary of Commerce, Gaithersburg, MD (US)

(72) Inventors: Ian Robert Coddington, Boulder, CO (US); Nathan Reynolds Newbury, Boulder, CO (US); Jean-Daniel Deschenes, Quebec (CA); Fabrizio Raphael Giorgetta, Boulder, CO (US); Esther Baumann, Boulder, CO (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 179 days.

(21) Appl. No.: 18/141,647

(22) Filed: May 1, 2023

(65) Prior Publication Data

US 2023/0349761 A1 Nov. 2, 2023

Related U.S. Application Data

(60) Provisional application No. 63/336,542, filed on Apr. 29, 2022.

(51) Int. Cl.
*G01J 3/433* (2006.01)
*G01J 3/02* (2006.01)
(Continued)

(52) U.S. Cl.
CPC ............ *G01J 3/433* (2013.01); *G01J 3/0248* (2013.01); *G01J 3/45* (2013.01); *G01J 2003/2836* (2013.01); *G01J 2003/4332* (2013.01)

(58) Field of Classification Search
CPC .. G01J 3/433; G01J 3/0248; G01J 3/45; G01J 2003/2836; G01J 2003/4332; G01J 3/10; G01J 3/453
See application file for complete search history.

(56) References Cited

U.S. PATENT DOCUMENTS

2015/0253645 A1* 9/2015 Coddington ........ H01S 3/06712
359/328
2015/0380892 A1* 12/2015 Fermann .............. G01N 21/636
372/18

(Continued)

OTHER PUBLICATIONS

Fully_digital_programmable_optical_frequency_comb_generation_and_application (Year: 2018).*

(Continued)

*Primary Examiner* — Tarifur R Chowdhury
*Assistant Examiner* — Carlos Perez-Guzman
(74) *Attorney, Agent, or Firm* — Office of Chief Counsel for National Institute of Standards and Technology

(57) ABSTRACT

Embodiments of the present invention relate to apparatus and methods for dual comb spectroscopy with deterministic stepping and scanning of temporal pulse offset. In one embodiment, the present invention relates to a novel dual-comb spectroscopy including mode locked robust Er-combs and digital phase-locking electronics for step scanning between the two frequency combs and applicable to any phase-locked dual-comb system. The tight phase control of the DCS source allows for the control of temporal offset between the two comb pulses during measurements.

28 Claims, 12 Drawing Sheets

(51) Int. Cl.
    *G01J 3/28*         (2006.01)
    *G01J 3/45*         (2006.01)

(56) References Cited

U.S. PATENT DOCUMENTS

2018/0216996 A1*   8/2018   Kieu ................ H01S 3/1112
2019/0391016 A1*  12/2019   Bourbeau Hébert ...............
                                               G01B 9/02008

OTHER PUBLICATIONS

Keilmann, F., et al., "Time-domain mid-infrared frequency-comb spectrometer", Optics Letters, 2004, p. 1542-1544, vol. 29 No. 13.
Tourigny-Plante, A., et al., "Apodization in dual-comb spectroscopy for rapid measurement", OSA Optical Sensors and Sensing Congress, 2020, p. 1-2.
Martin-Mateos, P., et al., "Direct hyperspectral dual-comb imaging", Optica, 2020, p. 199-202, vol. 7 No. 3.
Voumard, T., et al., "AI-enabled real-time dual-comb molecular fingerprint imaging", Optics Letters, 2020, p. 6583-6586, vol. 45 No. 24.

\* cited by examiner (A)

(B)

(A)

(B)

APPARATUS AND METHOD FOR DUAL COMB SPECTROSCOPY

CROSS-REFERENCE TO RELATED APPLICATION

This application claims the benefit of priority from U.S. Provisional Patent Application Ser. No. 63/336,542, filed on Apr. 29, 2022, the disclosure of which is incorporated herein by reference in its entirety.

STATEMENT REGARDING FEDERAL RIGHTS

The invention described herein was made with United States Government support from the National Institute of Standards and Technology (NIST), an agency of the United States Department of Commerce. The United States Government has certain rights in the invention.

FIELD OF THE INVENTION

The present invention relates generally to an apparatus and method for performing dual comb spectroscopy.

BACKGROUND OF THE INVENTION

Conventional dual-comb spectroscopy (DCS) uses two frequency combs, an interrogating comb light beam to probe a sample and a second comb light beam having a different repetition rate or comb spacing, to produce an interferogram which arises from the multi-heterodyning of the comb lines from the two beams. The discrete Fourier transform of the interferogram consists of evenly spaced narrow-band components, each of which carries the information about magnitude and phase of the two optical comb lines that generated the component. This configuration allows the system to read out a spectroscopic signal imprinted on one or both combs.

In conventional DCS, the comb repetition rates ($f_r$) are set to a fixed offset so that a specimen's time-domain optical response is sampled evenly and monotonically from zero to $1/f_r$, thereby mimicking the operation of a Fourier-Transform Infrared Spectrometer (FTIR) having a maximum path difference of $c_o/f_r$ ($c_o$: speed of light). This fixed sampling pattern leads to tradeoffs between spectral resolution, signal-to-noise ratio (SNR), and spectral bandwidth. For example, the time domain response for a gas typically exhibits a strong "centerburst" at zero relative pulse delay, followed by an exponentially decaying molecular free-induction tail extending to longer relative pulse delays. In conventional DCS with lower repetition rate frequency combs, it is typical to sample beyond this tail, thus acquiring "empty" spectral resolution. Several methods that have been proposed to circumvent these constraints include the use of high repetition-frequency or mode-interleaved combs, optical sampling by cavity tuning with delay lines or apodization approaches. These proposed methods to circumvent the constraints have their own tradeoffs and lack flexibility, for example, having to adapt for both high and low spectral resolutions with a single system while optimizing SNR.

Accordingly, there is a need for a free-form DCS apparatus with time programmable frequency combs, which provide digital, dynamic, attosecond-level control of the frequency comb pulse trains timing and carrier phase. There is also a need for a DCS apparatus where the comb repetition rate difference need not be preset, but instead allow direct control of relative timing between the comb pulse trains, thereby allowing for sophisticated and optimized sampling patterns than previously possible in DCS and allowing for full optimization of spectral resolution and SNR for any given sampling application.

SUMMARY OF THE INVENTION

Embodiments of the present invention relate to apparatus and methods for dual comb spectroscopy with deterministic stepping and scanning of the temporal pulse offset between the two comb pulse trains. Any phase-locked dual frequency comb can be used in embodiments of the present invention. In one embodiment, the present invention uses frequency combs based on mode locked robust Er-fiber lasers. The tight phase control of the DCS frequency comb sources allows for the control of temporal offset between the two comb pulses during measurements. Unlike the conventional DCS, where there is a monotonical advancement of the relative temporal spacing between the two comb pulse trains leading to a set even sampling intervals, the novel DCS apparatus in accordance with embodiments of the present invention can break this requirement of even sampling intervals.

Accordingly, embodiment of the present invention relate to a method of dual comb spectroscopy for detecting a sample, which include generating a first programable frequency comb with a first optical pulse train, wherein the first optical pulse train is phase stabilized by applying a first phase-lock to the first programmable frequency comb at a first frequency of the first programmable frequency comb electro-magnetic spectrum and a second phase-lock to the first programmable frequency comb at a second frequency of the first programmable frequency comb electro-magnetic spectrum to a reference oscillator; generating a second programable frequency comb with a second optical pulse train, wherein the second optical pulse train is phase stabilized by applying a third phase-lock to the second programmable frequency comb at a third frequency of the second programmable frequency comb electro-magnetic spectrum and a fourth phase-lock to the second programmable frequency comb at a fourth frequency of the second programmable frequency comb electro-magnetic spectrum to the reference oscillator; generating a sampling pattern comprising a sequence of a plurality of relative delays between the first optical pulse train and the second optical pulse train; determining a first phase offset from the sampling pattern for applying to the first phase-lock of the first programmable frequency comb and a second phase offset from the sampling pattern for applying to the second phase-lock of the first programmable frequency comb; applying at least one of the first and the second phase offsets to the first programmable frequency comb to set the sequence of the plurality of the relative delays between the first optical pulse train and the second optical pulse train; directing at least one of the first and the second pulse trains through the sample to probe the sample; detecting an optical output from the probed sample; digitizing the detected optical output from the probed sample; demodulating the digitized optical output to generate an optical field product of the first optical pulse train and the second optical pulse train, wherein the optical field product of the first and the second optical pulse trains is generated at the sequence of the plurality of the relative delays between the first optical pulse train and the second optical pulse train; and reconstructing the demodulated digitized optical output to generate a representation of the sample response. More particularly, the representation of the sample response is a frequency domain spectrum.

In one embodiment of the present invention, the method of dual comb spectroscopy for detecting a sample further includes determining a third phase offset from the sampling pattern for applying to the third phase-lock of the second programmable frequency comb and a fourth phase offset from the sampling pattern for applying to the fourth phase-lock of the second programmable frequency comb; and applying at least one of the third and the fourth phase offsets to the second programmable frequency comb. In another embodiment of the present invention, the method of dual comb spectroscopy for detecting a sample further includes combining the first and the second optical pulse trains to generate a combined optical pulse train, wherein the directing the first and the second optical pulse trains comprises directing the combined optical pulse train though the sample to probe the sample.

In one embodiment of the present invention, the sampling pattern is a real time apodization sampling pattern. In another embodiment of the present invention, the sampling pattern is a compressive sampling pattern that comprises a random and uneven sequence of a plurality of relative delays between the first optical pulse train and the second optical pulse train. In yet another embodiment of the present invention, the sampling pattern is a recurrence sampling pattern, wherein the recurrence sampling pattern adjusts the plurality of the relative time delays between the first programmable frequency comb and the second programmable frequency comb from zero to at least one of a plurality of predetermined values.

Another embodiment of the present invention relate to a method of dual comb spectroscopy for detecting a sample, which includes generating a first optical pulse train from a first programmable frequency comb and a second optical pulse train from a second programmable frequency comb, wherein the first and the second optical pulse trains are optically coherent with a stabilized relative pulse delay; determining a first carrier-envelope offset frequency for the first programmable frequency comb and a second carrier-envelope offset frequency for the second programmable frequency comb; applying to the first and the second carrier-envelope offset frequencies a first and a second phase-lock to a reference oscillator; applying to the first and the second programmable frequency combs a third and a fourth phase-locks to a common narrow linewidth single mode continuous wave laser to set the first and the second optical pulse trains from the first and second programmable frequency combs to have a fixed relative pulse delay and carrier frequency offset; generating compressive sampling pattern for varying the relative pulse delay between the first optical pulse train of the first programmable frequency comb and the second optical pulse train of the second programmable frequency comb for at least one of a plurality of compression factors; determining a first phase offset from the compressive sampling pattern for applying to the first phase lock of the first programmable frequency comb and a second phase offset from the compressive sampling pattern for applying to the second phase lock of the first programmable frequency comb; applying at least one of the first and the second phase offsets to the first programmable frequency comb to set a sequence of a plurality of relative delays between the first optical pulse train and the second optical pulse train; directing at least one of the first and the second pulse trains through the sample to probe the sample; detecting an optical output from the probed sample; digitizing the detected optical output from the probed sample; demodulating the digitized optical output to generate a signal proportional to the optical field product of the first optical pulse train and the second optical pulse train, wherein the optical field product of the first and the second optical pulse trains are generated at the plurality of the relative delay times of the compressive sampling pattern; and reconstructing the demodulated digitized optical output to generate a sample response spectrum.

In one embodiment of the present invention, the method of dual comb spectroscopy for detecting a sample further includes determining a third phase offset from the compressive sampling pattern for applying to the third phase lock of the second programmable frequency comb and a fourth phase offset from the compressive sampling pattern for applying to the fourth phase lock of the second programmable frequency comb; and applying at least one of the third and the fourth phase offsets to the second programmable frequency comb.

In one embodiment of the present invention, the method of dual comb spectroscopy for detecting a sample further includes combining the first and second optical pulse trains to generate a combined optical pulse train, wherein the directing the first and the second optical pulse trains comprises directing the combined optical pulse train though the sample to probe the sample.

Embodiments of the present invention also relate to a dual comb spectroscopy apparatus for detecting a sample, including: a first programmable frequency comb configured to generate a first optical pulse train; a second programmable frequency comb configured to generate a second optical pulse train; a time programming controller configured to generate a sampling pattern comprising a sequence of a plurality of relative delays between the first optical pulse train and the second optical pulse train, wherein the time programming controller determines the plurality of the relative delays between the first optical pulse train and the second optical pulse train; a first common narrow linewidth single mode continuous wave laser source for referencing the first and the second programmable frequency combs; a first comb controller configured to phase-lock the first programmable frequency comb to the first common narrow linewidth single mode continuous wave laser source with a first phase offset and to phase-lock a carrier-envelope offset frequency of the first programmable frequency comb with a second phase offset, wherein the first comb controller adjusts at least one of the first and the second phase offsets to dynamically control the first optical pulse train timing; a second comb controller configured to phase-lock the second programmable frequency comb to the first common narrow linewidth single mode continuous wave laser source with a third phase offset and to phase-lock a carrier-envelope offset frequency of the second programmable frequency comb with a fourth phase offset, wherein the second comb controller adjusts at least one of the third and the fourth phase offsets to dynamically control the second optical pulse train timing; a sample area for receiving the sample for detection, wherein the sample area is configured to receive the first and the second optical pulse trains, wherein the sample area is configured to direct the first and the second optical pulse trains to the sample to generate an optical output; a detector for detecting the optical output from the sample; and a first processor for reconstructing the detected optical output to generate a reconstructed sample response.

In one embodiment, the apparatus further includes an optical combining section for combining the first optical pulse train and the second optical pulse train to generate a combined optical pulse train. In some embodiments, the optical combining section is positioned after the sample area. In other embodiments, the optical combining section is positioned before the sample area.

In another embodiment of the present invention, the apparatus further includes a digitizer for digitizing the detected optical output from the sample; and a second processor for demodulating the detected optical output to generate an optical field product of the first optical pulse train and the second optical pulse train, wherein the optical field product of the first and the second optical pulse trains are generated at the plurality of the relative delays between the first optical pulse train and the second optical pulse train. In one embodiment, the detector is a focal plane array camera Another embodiment of the present invention relates to a dual comb spectroscopy apparatus for detecting a sample, including: a first programmable frequency comb configured to generate a first optical pulse train; a second programmable frequency comb configured to generate a second optical pulse train; a time programming controller configured to generate a sampling pattern comprising a sequence of a plurality of relative delays between the first optical pulse train and the second optical pulse train, wherein the time programming controller determines the plurality of the relative delays between the first optical pulse train and the second optical pulse train; a first common narrow linewidth single mode continuous wave laser source and a second common narrow linewidth single mode continuous wave laser source for referencing the first and the second programmable frequency combs; a first comb controller configured to phase-lock the first programmable frequency comb to the first common narrow linewidth single mode continuous wave laser source with a first phase offset and to phase-lock the first programmable frequency comb to the second common narrow linewidth single mode continuous wave laser source with a second phase offset, wherein the first comb controller adjusts at least one of the first and the second phase offsets to dynamically control the first optical pulse train timing; a second comb controller configured to phase-lock the second programmable frequency comb to the first common narrow linewidth single mode continuous wave laser source with a third phase offset and to phase-lock the second programmable frequency comb to the second common narrow linewidth single mode laser with a fourth phase offset, wherein the second comb controller adjusts at least one of the third and the fourth phase offsets to dynamically control the second optical pulse train timing; a sample area for receiving the sample for detection, wherein the sample area is configured to receive the first and the second optical pulse trains, wherein the sample area is configured to direct the first and the second optical pulse trains to the sample to generate an optical output; a detector for detecting the optical output from the sample; and a first processor for reconstructing the detected optical output to generate a reconstructed sample response.

DETAILED DESCRIPTION

Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein.

A frequency comb may be regarded as a spectral characteristic of the optical output of a suitably controlled laser source. In particular, the laser source may be suitably controlled to generate an optical output whose spectrum consists of a series of discrete, equally spaced (in frequency) spectral lines.

Figure 1:
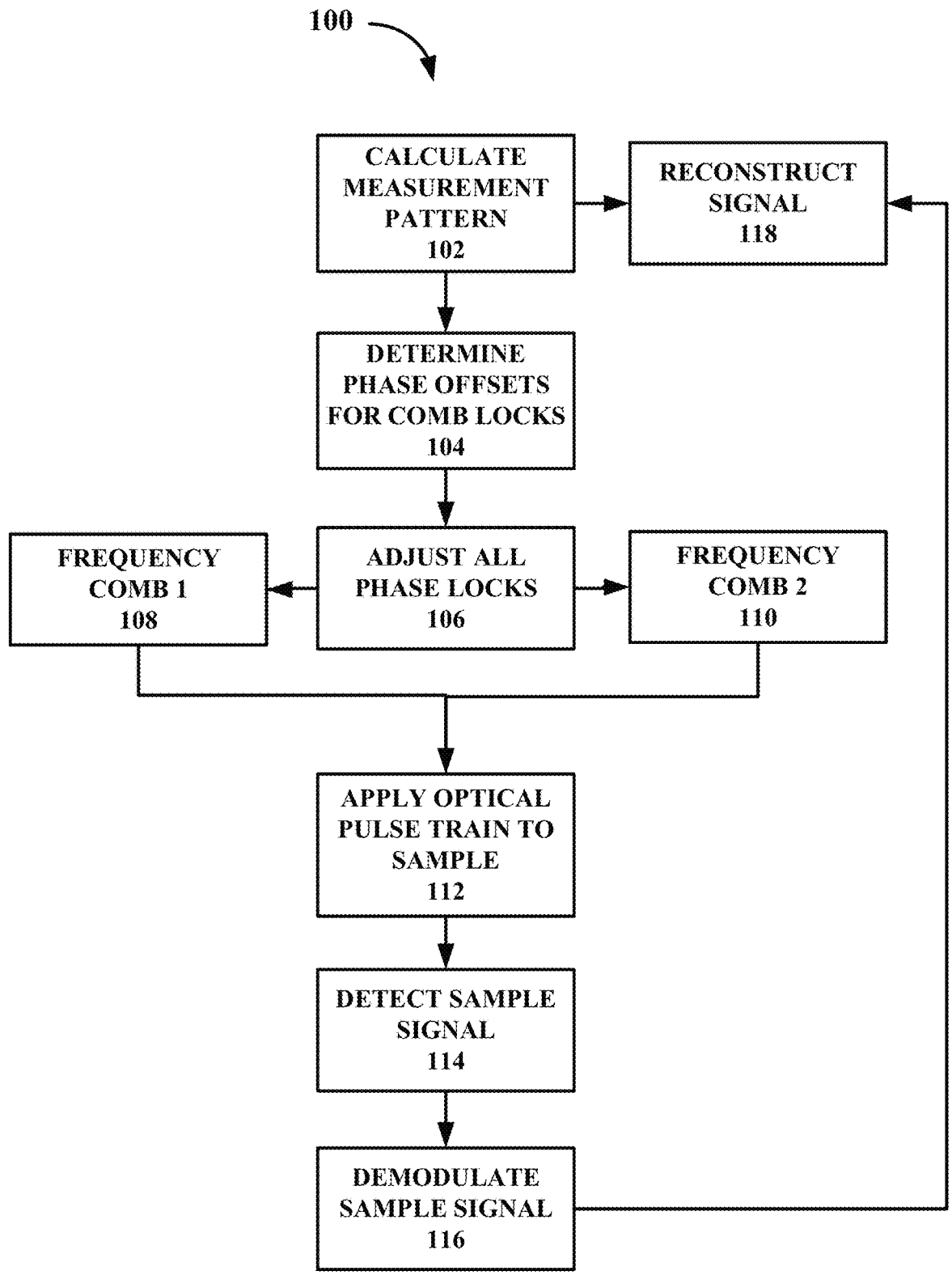
FIG. 1 illustrates a schematic representation of a free-form DCS method in accordance with an embodiment of the present invention.
Figure 2:
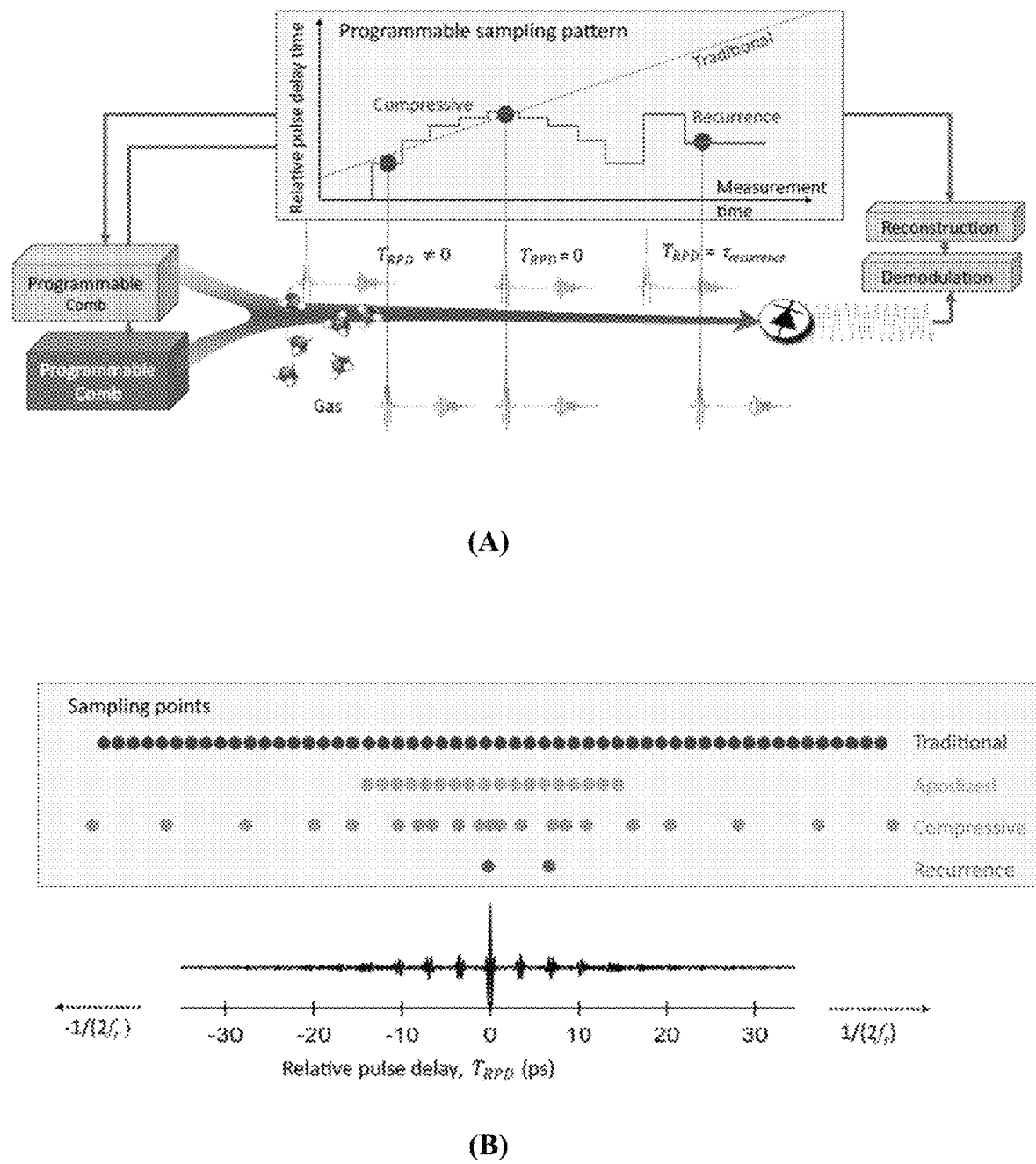
FIG. 2 illustrates an alternate schematic depiction of a free-form DCS method in accordance with an embodiment of the present invention.

Referring now to the drawings, and more particularly, to FIG. 1, there is shown a method for free-form dual comb spectroscopy, generally designated 100 and schematically showing an embodiment of the present invention, for providing digital, dynamic, attosecond-level control of the frequency comb pulse trains timing and carrier phase. At step 102, sampling patterns that vary the relative pulse delays ($T_{RPD}$) between combs are determined. In one embodiment of the present invention, sampling pattern determined at step 102 include real time apodization. In a second embodiment of the present invention, sampling pattern determined at step 102 include compressive sampling. In another embodiment of the present invention, sampling pattern determined at step 102 include recurrence sampling. The inset in FIG. 2(A) shows the relationship between relative pulse delay timing and actual measurement time for traditional DCS as compared to the free-form operating modality applied.

The mutual coherence and stabilized relative pulse delay between the combs is determined by two phase-locks applied to each of the two combs. These phase-locks are used to set both the relative pulse delay ($T_{RPD}$) between the comb pulse trains and to set the relative optical carrier frequencies between the comb pulse trains to a value $f_{if}$. To set the dual-comb pulses to a specific relative pulse delay ($T_{RPD}$) as part of a given sampling pattern, the required phase offsets $\Delta\theta_0^{c1}$, $\Delta\theta_0^{c2}$, $\Delta\theta_N^{c1}$, $\Delta\theta_N^{c2}$ are determined at step 104, wherein c1 represents comb1, c2 represents comb2, 0 represents lock point at zero tooth (the carrier-envelope offset frequency) and N represents lock point at the "N-th" comb tooth. At step 106, the two phase-locks acting on actuators phase stabilizing each of the two dual combs optical pulse trains are adjusted by these phase offsets determined at step 104. Either phase-offsets, and thus $T_{RPD}$, are adjusted continuously for continuous scanning or adjusted intermittently for step scanning while keeping the comb repetition rates fixed. Relative pulse delay is induced using the following relationship, where $f_r$ is the repetition rate of the combs:

$$\Delta T_{RPD} = \frac{\Delta\theta_0^{c1} + \Delta\theta_0^{c2} - \Delta\theta_N^{c1} - \Delta\theta_N^{c2}}{2\pi N f_r}$$

At steps 108 and 110, the dual time-programmable frequency combs are optically phase-stabilized using the real-time adjustable digital phase-locks from step 106. Multiple comb stabilization approaches can be used in DCS methods in accordance with embodiments of the present invention. In one embodiment, the carrier-envelope offset (CEO) frequency for each comb is phase-locked to a stable radio frequency (rf) source, and then, both combs are phase-locked to a common narrow linewidth single mode continuous wave (CW) laser at the Nth comb tooth. In another embodiment, the phase-lock to the CEO frequency is replaced by a phase-lock to a second common narrow linewidth single-mode CW lasers. In such embodiment, the above equation is modified such that N is replaced by the difference in the number of the comb teeth locked to the first and second narrow linewidth lasers. The combination of the actuator dynamic range and phase-lock processing bandwidth used for these phase-locks also set a maximum slew rate for adjusting the relative pulse delay. In one embodiment of the present invention, a maximum slew rate for adjusting the relative pulse delay is ~65 ns/s. The use of a tracking filter in the phase-lock processing and alternative actuators could allow for faster slew rates. A relative pulse delay between the comb pulse trains ($\Delta T_{RPD}$) is dynamically reached within the maximum slew rate to obtain attosecond reproducibility and accuracy, even for picosecond or nanosecond scale jumps, while maintaining full phase coherence. In embodiments of the present invention, the repetition rates of frequency combs will remain identical regardless of the chosen pulse trains ($T_{RPD}$), while the relative comb pulse carrier frequency ($f_{if}$) is set to a single determined value such that the heterodyned combs generate a single tone at a predetermined intermediate frequency ($f_{if}$). The measurement update rate is limited only by $f_{if}$ which can be as high as $f_r/4$, where $f_r$ is the comb repetition rate. In one embodiment of the present invention, intermediate frequency ($f_{if}$) is selected from about 100 Hz to about 2.5 MHz.

Optical pulse trains generated from phase stabilized dual time-programmable frequency combs at steps 108 and 110 are combined and applied to a sample at step 112 to probe the sample. In another embodiment, the optical pulse train from the first programmable frequency comb probes the sample and is then combined with the optical pulse train from the second programmable frequency comb. Sample signal is detected at step 114, and the signal is demodulated at step 116 to return the optical field product of the comb pulses at the sampled relative pulse delays. Demodulation at intermediate frequency ($f_{if}$) yields a signal magnitude equal to an interferogram value at that relative pulse delay, as shown in FIGS. 8, 9, 10 and 11. The demodulated signals from step 116 are reconstructed at step 118 to generate a visual or graphical representation, or an absolute value, of the sample's response to the phase stabilized dual time-programmable frequency combs applied to the sample at step 112. In embodiments wherein the sampling pattern is compressed sampling, the demodulated signals from step 116 are reconstructed at step 118 to generate a representation of the sample response. In embodiments wherein the sampling pattern is recurrence sampling, the demodulated signals from step 116 are calibrated at step 118 to reveal an absolute sample absorbance value. This calibration can be done via a single initial traditional DCS measurement, which would also reveal the presence of possible additional gas components. Further perturbations common to both combs, for example due to turbulent gas flow, are corrected with the detected DC voltage before demodulation. Perturbations that are not common to both combs can be normalized out by periodic continuous sampling on only a reduced part of the interferogram (apodized sampling across the centerburst).

Conventional DCS relies on control of the relative comb repetition rates and their difference ($\Delta f_r$) to sample at continuous, evenly spaced increments of $\Delta T_{RPD} = \Delta f_r / f_r^2$ over relative pulse delays from $-\frac{1}{2}f_r$ to $+\frac{1}{2}f_r$, as illustrated by the diagonal line in FIG. 2(A) (inset). The resulting heterodyne signal is broadband and can be mapped to the frequency-domain spectral response. DCS methods in accordance with embodiments of the present invention use the ability to control the relative pulse delay, arbitrary sampling patterns can be programmed to probe the gas response in a focused manner (real time apodization), in a weighted random manner for compressive sampling, or at a fixed time offset matched to characteristic molecular rotational recurrences.

FIG. 2(B) illustrates four sampling strategies: traditional DCS sampling with fixed offset repetition frequencies and three free-form sampling patterns; real time apodization; compressive sampling; and recurrence sampling. The dots schematically indicate the sampled relative pulse delay compared to the time-domain response of a molecular gas (shown below by an exemplary interferogram obtained using conventional DCS or FTIR spectroscopy). The exemplary interferogram shown in FIG. 2(B) simulates the response of a small molecule (e.g., methane) to a broad optical pulse, exhibiting the "centerburst", set by the overlap of the two comb pulses at $T_{RPD}=0$, and the subsequent free induction decay. Because both combs are transmitted through the sample, the molecular signal is symmetric about the centerburst; transmission of only one comb is also possible and would result in a one-sided free-induction decay signal.

Figure 3:
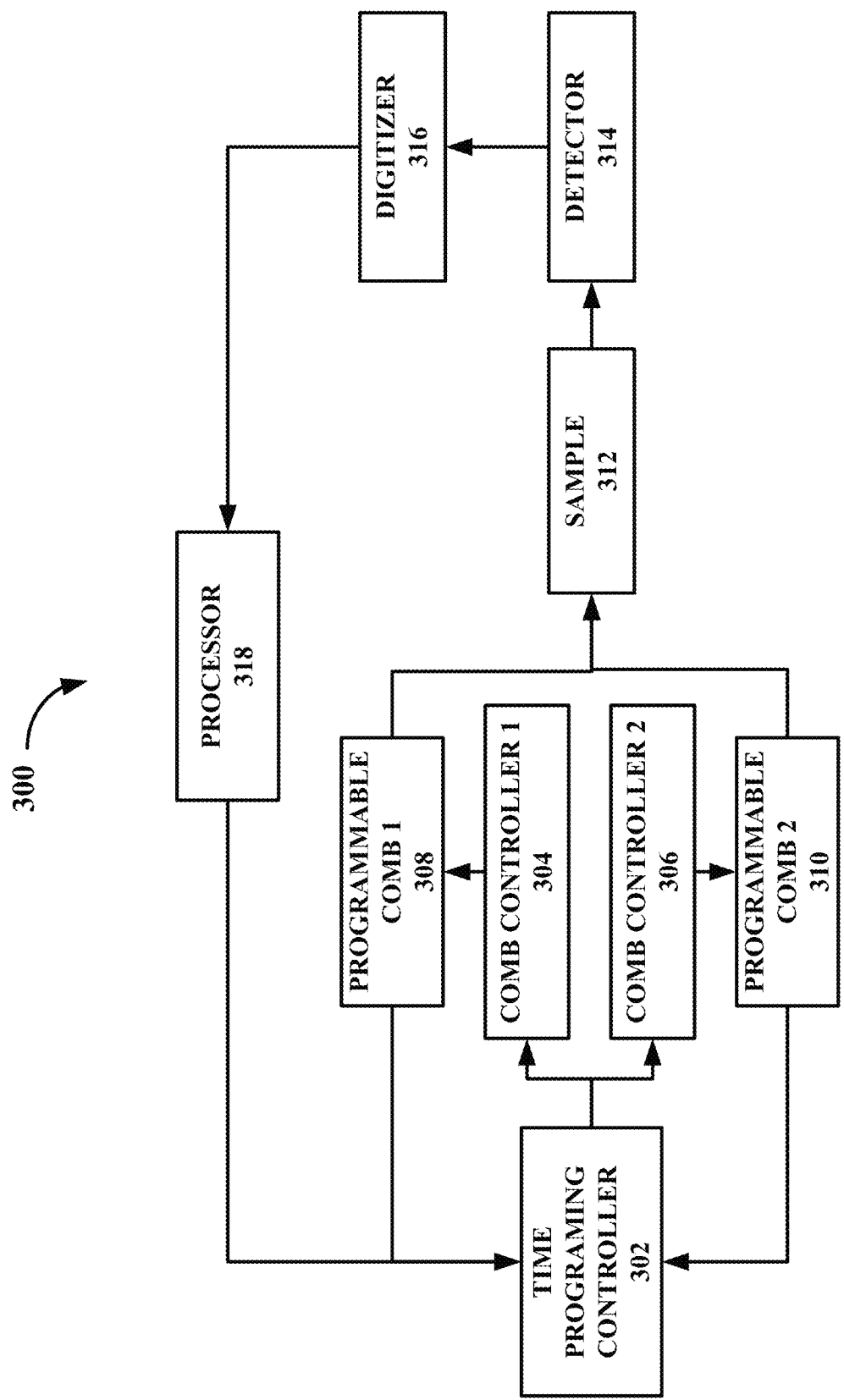
FIG. 3 illustrates a schematic depiction of a DCS apparatus in accordance with an embodiment of the present invention.

FIG. 3 illustrates an apparatus for dual comb spectroscopy, generally designated 300, in accordance with an embodiment of the present invention. Dual comb spectroscopy apparatus 300 includes a time programming controller 302, a first comb controller 304, a second comb controller 306, a first programmable frequency comb 308, a second programmable frequency comb 310, a sample area 312, a detector 314, a digitizer 316, and a processor 318.

Time programming controller 302 is configured to generate sampling patterns for relative pulse delay times $T_{RPD}$ between combs (comb pulse trains) and relative optical carrier frequency ($f_{if}$). Time programming controller 302 sets the maximum slew rate for adjusting pulse timing and, within this set slew rate, dynamically select relative pulse delay between comb pulse trains at attosecond accuracy.

First comb controller 304 is configured to determine phase offsets that need to be applied to the two phase-locks of first programmable frequency comb 308 for dynamical control of relative pulse delay and optical carrier frequency from first programmable frequency comb 308. First comb controller 304 adjusts the two phase-locks for first programmable frequency comb 308 using the phase offsets determined. To maintain optical coherence between first programmable frequency comb 308 and second programmable frequency comb 310, one of the two phase-locks used to control the first programmable frequency comb 308 is referenced to a common reference oscillator. In one embodiment, the reference oscillator is a narrow linewidth single mode continuous wave (CW) laser. First comb controller 304 adjusts the phase-lock offsets with real-time dynamic digital control of first programmable frequency comb's 308 pulse timing to generate optical pulse trains.

Second comb controller 306 is configured to determine phase offsets that need to be applied to the two phase-locks of second programmable frequency comb 310 for dynamical control of pulse timing and optical carrier frequency from second programmable frequency comb 310. Second comb controller 306 adjusts the two phase-locks for second programmable frequency comb 310 using the phase offsets determined. To maintain optical coherence between first programmable frequency comb 308 and second programmable frequency comb 310, one of the two phase-locks used to control second programmable frequency comb 310 is referenced to the same common reference oscillator used for first programmable frequency comb 308. Second comb controller 306 adjusts the phase-lock offsets with real-time dynamic digital control of second programmable frequency comb's 310 pulse timing to generate optical pulse trains.

Optical pulse trains generated by first programmable frequency comb 308 and second programmable frequency comb 310 are applied to probe a sample located in sample area 312. The sample in sample area 312 interacts with the optical pulse trains from first programmable frequency comb 308 and second programmable frequency comb 310 to generate a signal. In one embodiment of the present invention, optical pulse trains generated by first programmable frequency comb 308 and second programmable frequency comb 310 are combined and applied to probe a sample located in sample area 312. In another embodiment of the present invention, optical pulse trains generated by first programmable frequency comb 308 and second programmable frequency comb 310 are combined after applying the optical pulse trains to probe a sample located in sample area 312.

Detector 314 detects the sample signal exiting sample area 312 and digitizer 316 digitizes the detected sample signal. In some embodiments of the present invention, detector 314 and digitizer 316 may be combined into a single component. In an exemplary embodiment of the present invention, detector 314 and digitizer 316 is a focal plane array camera. Processor 318 demodulates the digitized sample signal to return an optical field product of the comb pulses at the sampled relative pulse delays and reconstructs the demodulated signals to generate the sample's response. In embodiments wherein the sampling pattern is compressed sampling, processor 318 reconstructs the demodulated signals to generate the sample's frequency-domain response. In embodiments wherein the sampling pattern is recurrence sampling, processor 318 reconstructs the demodulated signals to generate calibrated signal equivalent to a samples spectral feature.

Figure 4:
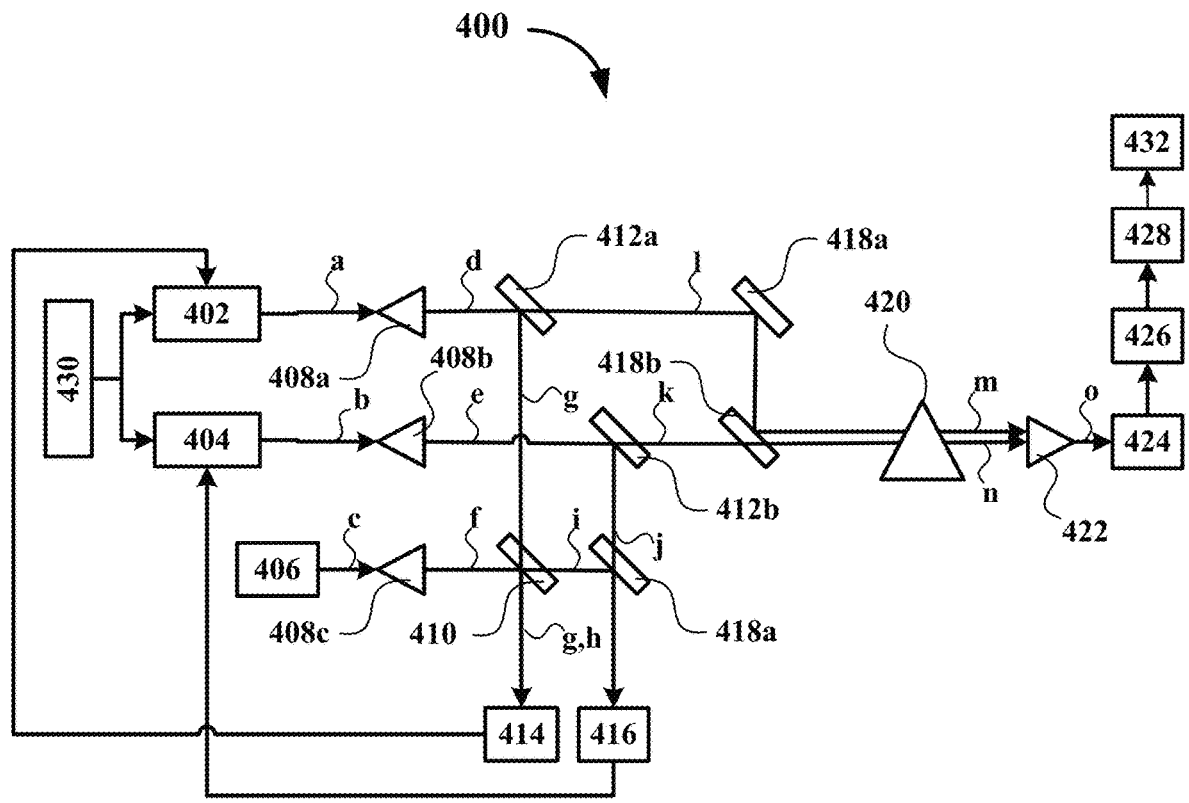
FIG. 4 illustrates a schematic depiction of a DCS apparatus in accordance with another embodiment of the present invention.

FIG. 4 illustrates an apparatus for dual comb spectroscopy, generally designated 400, in accordance with an alternate embodiment of the present invention. Dual-comb spectroscopy apparatus 400 includes a first comb source 402, a second comb source 404, a continuous wave laser light source 406, collimators 408, beam splitters 410, wedge prisms 412, a first optical heterodyne detector 414, a second optical heterodyne detector 416, mirrors 418, prism filter 420, coupler 422, a sample detection area 424, a detector 426, a digitizer 428, a time-programing controller 430, and a signal processor 432.

Figure 5:
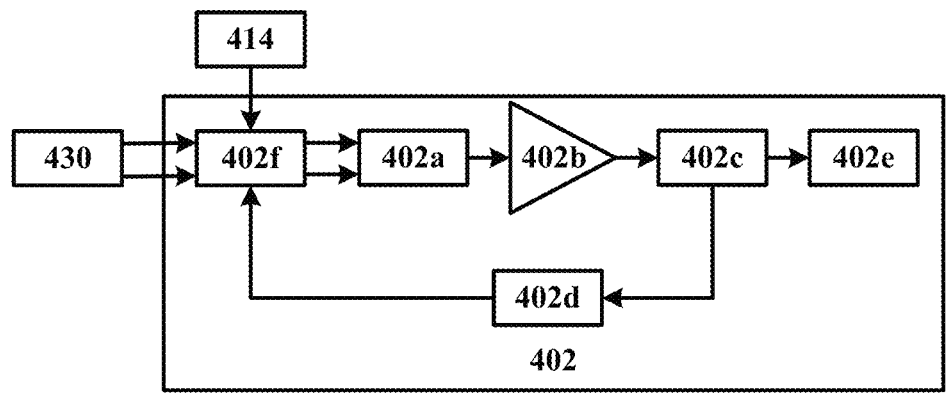
FIG. 5 illustrates components of dual combs as used in a DCS apparatus in accordance with an alternate embodiment of the present invention.
Figure 5:
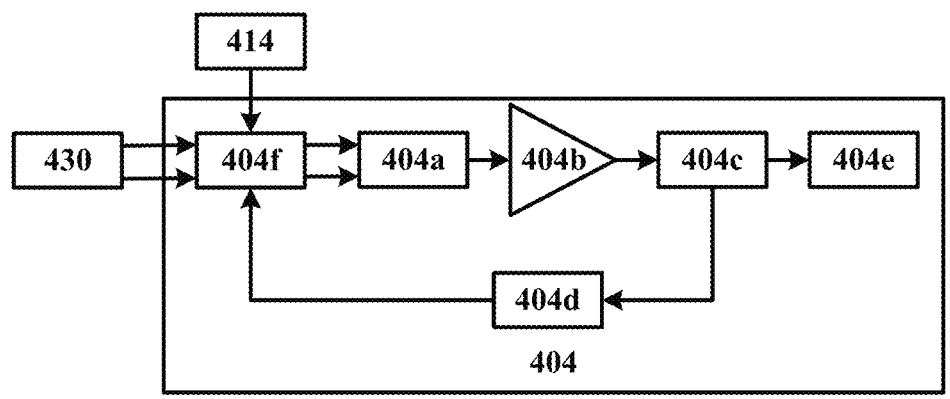

Components of first comb source 402 and second comb source 404 are identical, as shown in FIGS. 5(A) and 5(B). First comb source 402 and second comb source include all the components to generate a phase-locked frequency comb output except for the optical heterodyne signal to phase-lock to the CW laser, which is provided by first optical heterodyne detector 414 and a second optical heterodyne detector 416, respectively. Components for first comb source 402, as shown in FIG. 5(A), include an oscillator 402a, an optional first fiber amplifier 402b, an optical ratio splitter 402c, a f-2f carrier envelope offset frequency detection unit 402d, and an spectral shaping module 402e, and a phase-lock controller 402f that implements two phase-locked loops to control the comb pulse timing and carrier frequency via the two comb actuators and interacts with the time-programing controller 430. Oscillator 402a is a modelocked laser or other laser source that produces a train of coherent optical pulses whose timing and frequency are controllable by two actuators. In one embodiment, the oscillator is a linear erbium-doped fiber cavity with a semiconductor saturable absorber mirror that is pumped by a laser source. In one embodiment of the present invention, the pump laser source is a 1480 nm laser diode. In one embodiment, the two actuators control the pump laser power and the erbium-doped fiber cavity length.

The output beams from oscillator 402a are optionally amplified using first optical amplifier 402b. In one embodiment of the present invention, first optical amplifier 402b is an erbium-doped fiber amplifier pumped by two 980 nm laser diodes. The amplified beam from first fiber amplifier 402b is split using optical ratio splitter 402c into a first amplified beam and a second amplified beam. In one embodiment of the present invention, the first amplified beam is about 80 percent of the amplified beam from first fiber amplifier 402b.

The first amplified beam split from optical ratio splitter 402c is transmitted to f-2f carrier envelope offset frequency detection unit 402d. f-2f carrier envelope offset frequency detection unit 402d measures carrier-envelope offset frequency (CEO frequency) of the amplified beam, which is the offset between the optical phase and the maximum of the wave envelope of the optical pulses in the amplified beam. In some embodiments of the present invention, detection unit 402d measures carrier-envelope offset frequency (CEO frequency) of the amplified beam with a f-2f interferometer via a beat note between the higher-frequency end of the comb spectrum with the frequency-doubled lower-frequency end. In an exemplary embodiment, f-2f CEO frequency detection is accomplished by broadening in a highly nonlinear fiber followed by doubling of the 1960 nm supercontinuum light in periodically poled potassium titanyl phosphate (PPKTP) and photodetection.

The second amplified beam from optical ratio splitter 402c is transmitted to spectral shaping module 402e that broadens and/or filters the optical spectrum according to a predetermined requirement for interrogating the sample. In one embodiment, this module includes an optical bandpass filter to block or remove any scattered amplified beam from first fiber amplifier 402b, an additional erbium-doped fiber amplifier, and highly nonlinear fiber for spectral broadening.

Phase-lock controller 402f receives the carrier-envelope offset frequency from carrier envelope offset frequency detection unit 402d, the optical heterodyne signal from the first optical heterodyne detector 414 or second optical heterodyne detector 416, and the two programmed phase offsets from time-programing controller 430. Based on these four signals, it implements a phase-locked loop to set the comb relative pulse delay and carrier frequency of the two frequency comb outputs.

Referring back to FIG. 4, the spectrally shaped beam a from spectral shaping module 402e is collimated into a free space collimated beam d using collimator 408a. The collimated beam d from collimator 408a is slightly deflected using wedge prism 412a such that at least a substantial portion of the deflected beam g is steered towards first optical heterodyne detector 414. In one embodiment of the present invention, wedge prism 412a is a CaF2 wedge having 7 percent reflection.

As discussed above, components of second comb source 404 are identical to the components of first comb source 402, and as such, also generates a spectrally shaped beam b. The spectrally shaped beam b from second comb source 404 is collimated into a free space collimated beam e using collimator 408b. The collimated beam e from collimator 408b is slightly deflected using wedge prism 412b such that at least a substantial portion of the deflected beam j is steered towards second optical heterodyne detector 416. In one embodiment of the present invention, wedge prism 412b is a CaF2 wedge having 7 percent reflection.

Time-programing controller 430 determines sampling patterns for relative pulse delays ($T_{RPD}$) and relative carrier frequency, $f_{if}$, between spectrally shaped beams from first comb source 402 and second comb source 404. In one embodiment of the present invention, sampling pattern determined by time-programing controller 430 include real time apodization. In a second embodiment of the present invention, sampling pattern determined by time-programing controller 430 include compressive sampling. In another embodiment of the present invention, sampling pattern determined by time-programing controller 430 include recurrence sampling, which is a subset of compressive sampling.

In some embodiments of the present invention, signals for first optical heterodyne detector 414 and second optical heterodyne detector 414 are generated in an intermediary free space section in order to reduce unwanted drifts in relative phase or time offset between first comb source 402 and second comb source 404. A continuous wave laser c generated by laser source 406 is collimated into a free space collimated beam f using collimator 408c. In one embodiment of the present invention, laser source 406 generates a narrow band continuous wave laser. Beam splitter 410 is positioned between wedge prism 412a and first optical heterodyne detector 414 to split the collimated beam f from collimator 408c into a first split beam h and a second split beam i. In one embodiment of the present invention, beam splitter 410 splits the deflected beam into a first and a second split beams at a 50:50 ratio. The first split beam h is transmitted to first optical heterodyne detector 414 and the second split beam i is transmitted to second optical heterodyne detector 416. Beam splitter 418a is positioned between wedge prism 412b and second optical heterodyne detector 416 to redirect the second split beam i from beam splitter 410 to second optical heterodyne detector 416. The first split beam h is combined with the first deflected beam g transmitted to first optical heterodyne detector 414 and the second split beam i is combined with the second deflected beam j transmitted to second optical heterodyne detector 416.

The deflected beam l from wedge prism 412a and deflect beam k from wedge prism 412b are redirected by mirror 418a and beam splitter 418b to an optional prism filter 420 and filtered by prism filter 420. Coupler 422 receives the free space filtered beams m and n from prism filter 420 and couple the free space filtered beams m and n into a fiber.

The coupled filtered beam o is applied to probe a sample located in sample area 424. The sample in sample area 424 interacts with the combined pulse trains in the filtered beam o to generate a signal. Detector 426 detects the sample signal exiting sample area 424 and digitizer 428 digitizes and demodulates the detected sample signal to return an optical field product of the comb pulses at the sampled relative pulse delays. The signal processor 432 reconstructs the demodulated signals to generate the sample's frequency-domain response.

As discussed above, several sampling strategies can be applied to dual time-programmable frequency combs for relative pulse delays ($T_{RPD}$) between combs. Reference now to the specific examples of sampling strategies which follow will provide a clearer understanding of apparatus and methods in accordance with embodiments of the present invention. The examples should not be construed as a limitation upon the scope of the present invention.

Example 1. Compressive Sampling

Compressive sampling can be used to recover a signal from far fewer measurement samples than required by traditional sampling approaches, provided the signal meets certain criteria. Conventional DCS effectively uses equidistant interferogram sampling to measure the spectrum of bandwidth $\Delta v$ with comb tooth resolution $f_r$. The sampling theorem $n > 2\Delta v/f_r$ independent samples, where the sample number n is bound to be quite large, reaching up to a million for broadband high-resolution spectra. Only k samples in the non-sparse time domain can be acquired by applying compressive sampling to DCS, which works well for molecular spectra with narrow spectral lines. In addition to the requirements on sparsity, compressive sampling requires that the k samples are chosen randomly, as opposed to a fixed spacing. A sampling is implemented on a non-equidistant grid with k<<n sampling points at relative pulse delay times randomly chosen following a probability density function (PDF) estimated from the sample's expected interferogram envelope. Since the interferogram is sampled on a non-equidistant time grid, the Fourier transform cannot be used directly to retrieve the spectrum. One-norm minimization is used in compressive sampling to reconstruct the signal in the sparse domain. Here we use basis pursuit minimization in the presence of noise to reconstruct the spectrum in the sparse frequency domain spectrum. Computing the n points of the reconstructed spectrum (vector x) from the k measured interferogram samples (vector b) is a one-norm convex optimization problem:

$$\underset{x}{\text{minimize}} \|x\|_1 \text{ subject to } \|Ax - b\|_2 \leq \sigma,$$

where $A = \Phi \Psi$ is a k-by-n sensing matrix that is the product of the k-by-n measurement matrix $\Phi$, and the n-by-n matrix Ψ, which is the representation basis or transform basis (see methods). The limit σ is based on the system noise. The Fourier basis is used here because of its familiarity, but a basis giving a sparser representation of the signal could lead to even higher compressibility.

Figure 6:
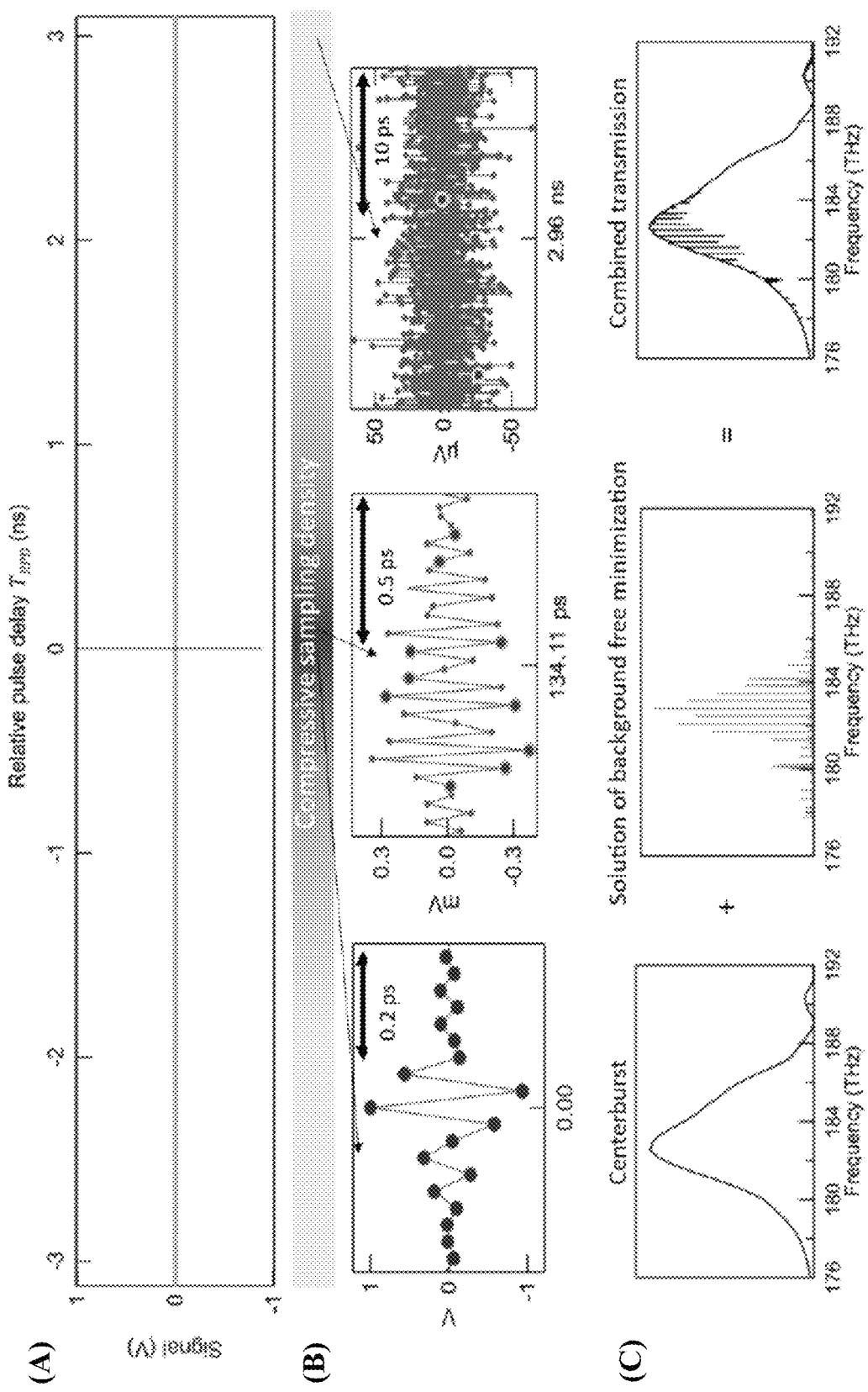
FIG. 6 illustrates an exemplary compressive sampling applied to a DCS apparatus in accordance with an alternate embodiment of the present invention.

FIG. 6 illustrates compressive DCS sampling applied to a 75 cm long gas cell containing 1.6% methane in 83 kPa of air, which mimics a 3 km long folded open-air path. The time-programmable frequency combs were based on self-referenced fiber-laser frequency combs operated at $f_r$=160 MHz, filtered to generate a ~10-THz wide comb spectrum centered at 183 THz encompassing the P, Q and R-branch of the $^{12}CH_4$, $2v_3$ (0020 F2) transitions. While molecular information is largely sparse in the spectral domain, the overall comb baseline spectrum is non-sparse. However, it is contained mostly in the interferogram centerburst. This baseline could be removed through optical subtraction schemes or by including a baseline estimate in the sampling pattern. Here, 93 centerburst samples are acquired on an equidistant sampling grid to estimate and remove the baseline before minimization. To measure the finer features of the spectrum associated with the gas absorption, measurement matrix Φ is populated with k random relative pulse delay times outside of the centerburst region as discussed above. One-norm minimization is then applied to recover the n-element spectrum vector x from the k-element compressed sampled time vector b (n»k). Finally, the reconstructed background-free gas spectrum x is inverse Fourier transformed to the time domain, combined with the 93 centerburst samples, and Fourier transformed to yield the full spectrum (FIG. 6(C)).

Compressive sampling allows for measurements of high-resolution spectra at much faster update rates than traditional DCS. One example provided herein focuses on concentration retrievals of methane, a greenhouse gas. FIG. 7(A) shows experimentally acquired transmission spectra obtained from a gas cell following the process outlined in FIG. 6 for four different compression factors, CF=n/+(k+93), ranging from 21 to 155, as well as for a spectrum fully sampled by n=1/($\Delta T_{RPD}f_r$)=208,332 samples at equidistant spacing $\Delta T_{RPD}$~30 fs. For higher compression factors, the one-norm minimization sets weaker spectral features to zero (unity in transmission), but still captures the overall features at the intrinsic spectral resolution of $f_r$. Besides reducing the data burden by the compression factor, the acquisition time decreases from 10.78 seconds at compression factor 21 to only 1.84 seconds at compression factor 155.

To explore the impact on gas concentration retrievals, 100 spectra were acquired at each of the four compression factors, 21, 41, 80 and 155. These spectra were then fit to extract the methane mole fraction, $XCH_4$. Despite the reduction in measurement points and measurement time, the uncertainty in $XCH_4$ only increases slightly when increasing the CF from 21 to 155, as shown by the solid squares in FIG. 7(B). At higher CF, simulations show the uncertainty can grow rapidly (represented by x). The reduced measurement time does come with a penalty in terms of a slight negative bias in the methane retrievals that grows with higher compression factors, as shown by the corresponding x in FIG. 7(C).

Figure 7:
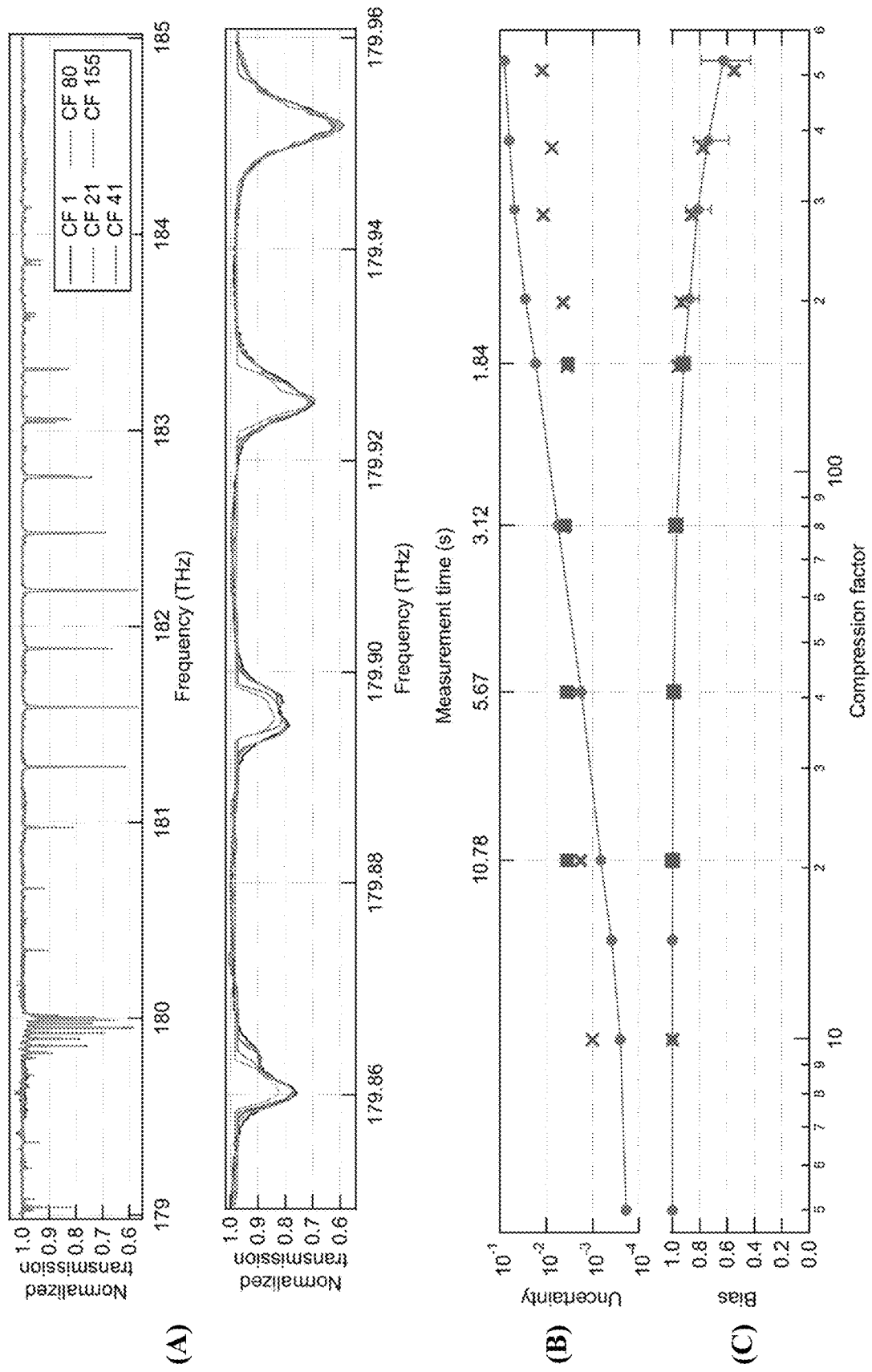
FIG. 7 illustrates a transmission spectra of methane gas acquired using compressive sampling shown in FIG. 6.
Figure 8:
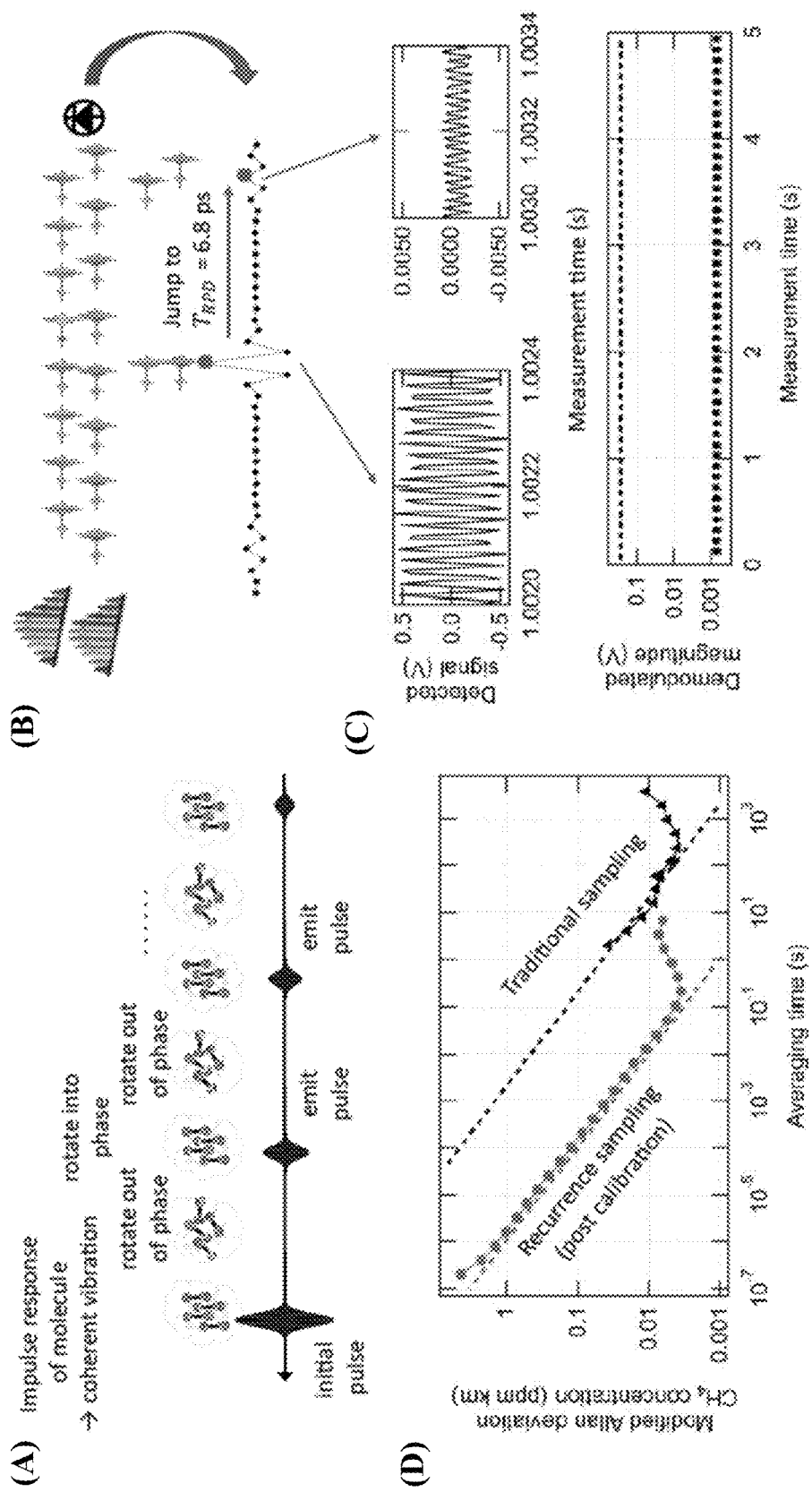
FIG. 8 illustrates an exemplary recurrence sampling applied to a DCS apparatus in accordance with an alternate embodiment of the present invention.
Figure 9:
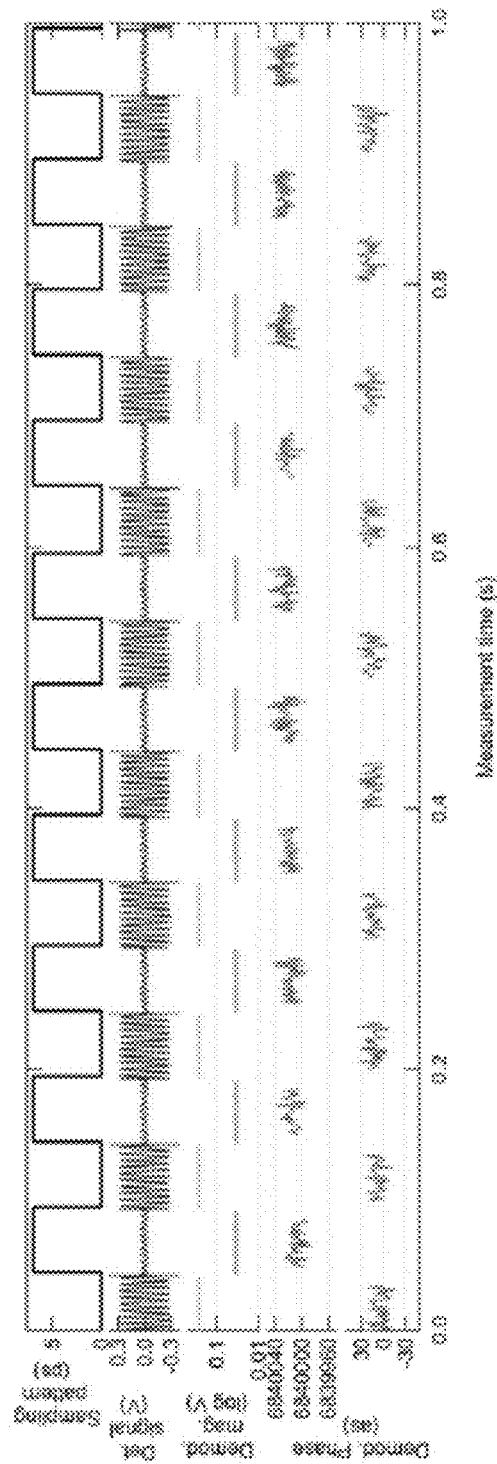
FIG. 9 illustrates a plot showing accuracy of relative pulse delay stepping in recurrence sampling mode.
Figure 10:
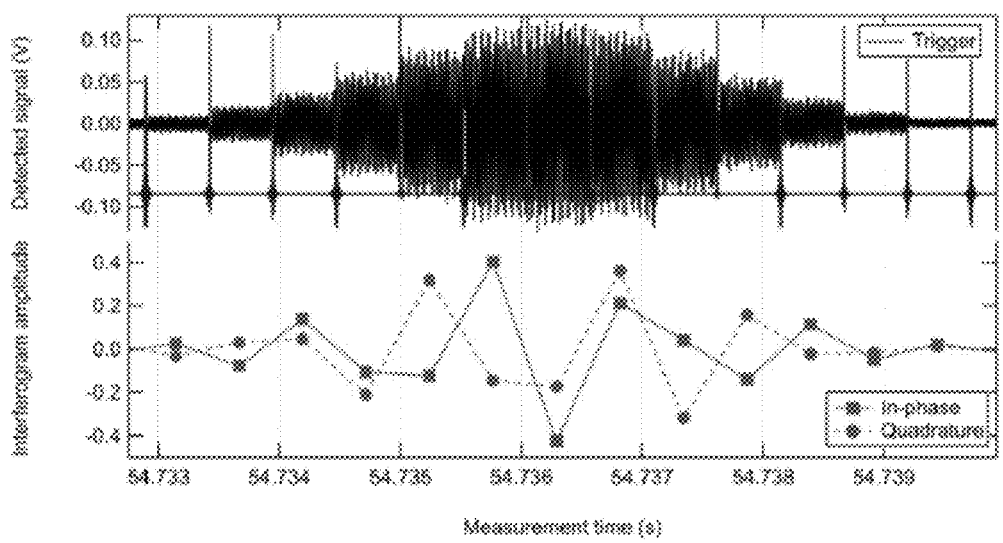
FIG. 10 illustrates an exemplary time-domain signal focusing on the centerburst portion of the interferogram as measured in the step-scan DCS modality.
Figure 11:
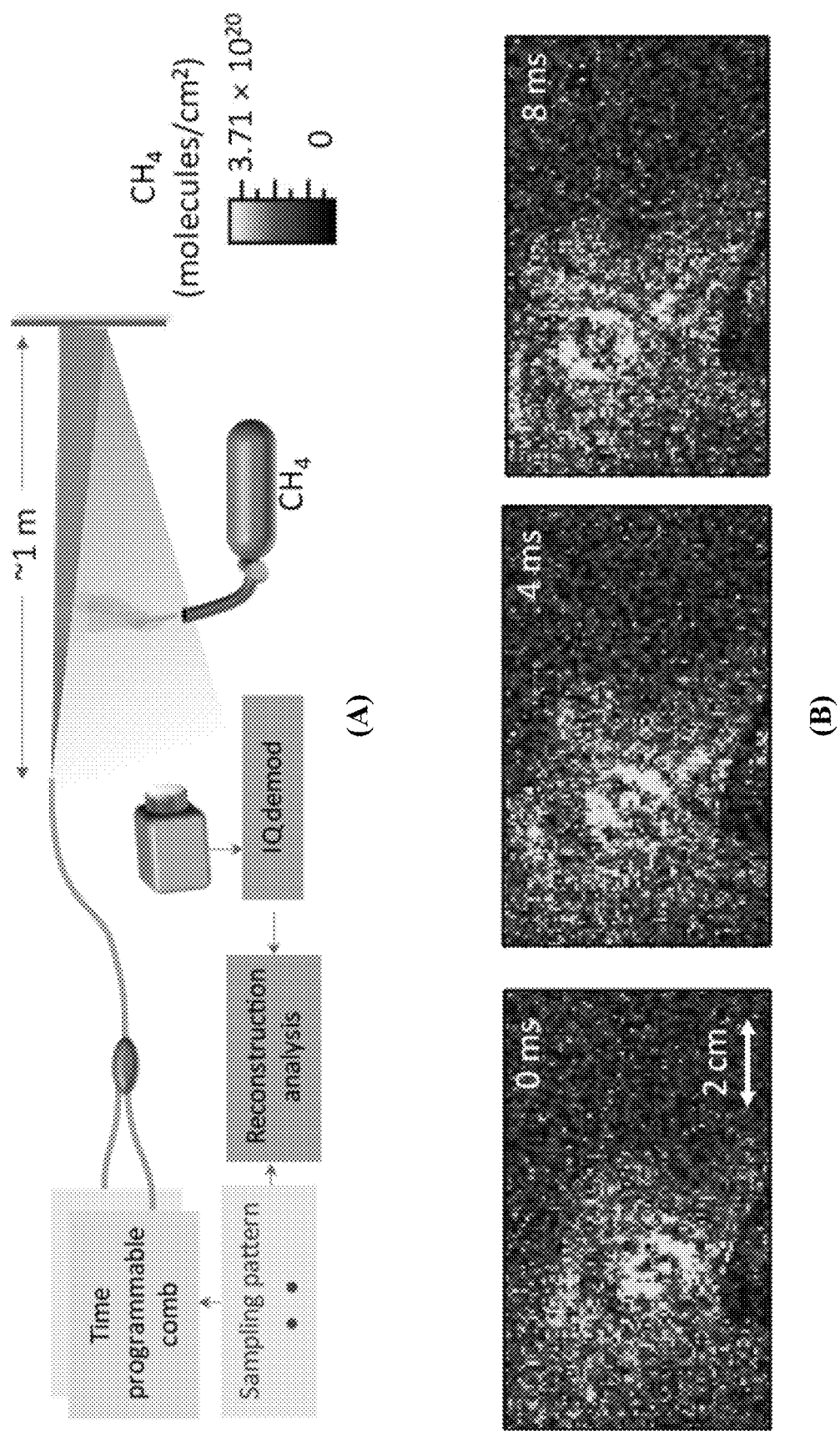
FIG. 11 illustrates recurrence sampling update rate matching to accommodate read-out with a focal plane array camera for spectral imaging.
Figure 12:
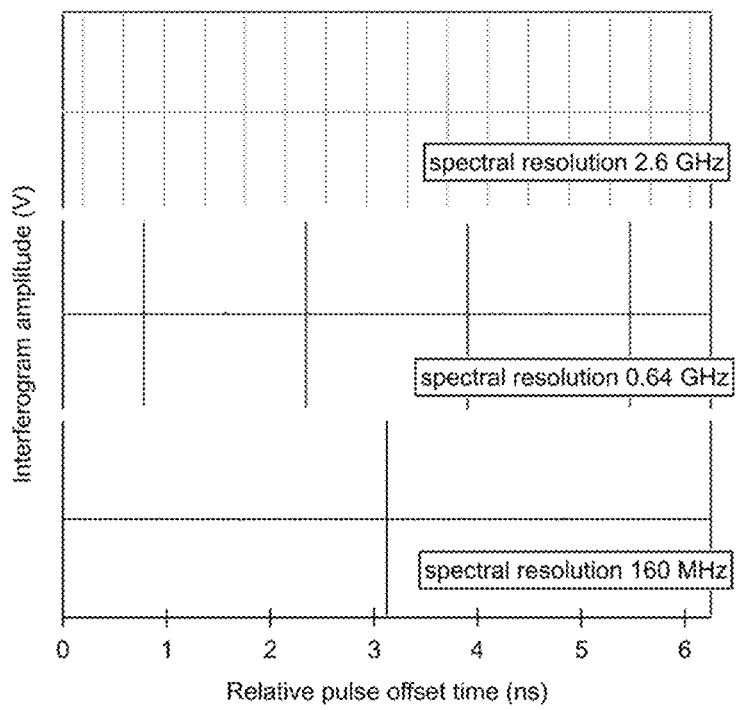
FIG. 12 illustrates real time apodization for scans over the central part of the interferogram to adapt the spectral resolution and the signal to noise ratio and reduce measurement time.
Figure 12:
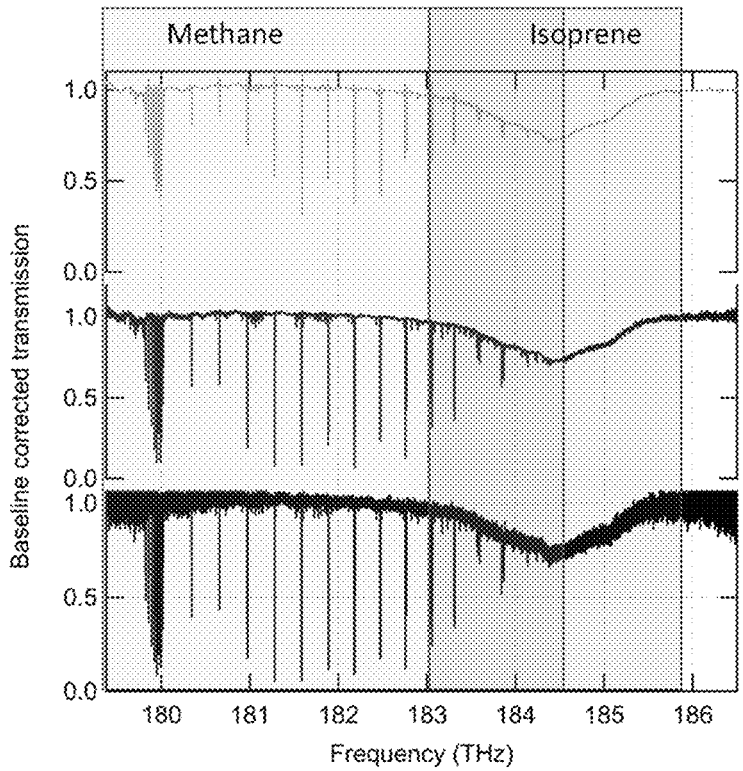

The data in FIG. 7 was acquired with the same fixed sampling pattern for the 100 measurements at each CF. To explore whether the choice of sampling pattern introduces uncertainty, a full experimental step scan measurements were acquired covering n=208,332 samples with equidistant steps in $\Delta T_{RPD}$=30 fs. In post-processing, we then applied 32 different sampling patterns (obeying the same PDF) were applied at each compression factor, followed by one-norm minimization and $XCH_4$ extraction, all with the same experimental noise realization. The green trace in FIG. 7(B) shows the calculated $XCH_4$ pattern uncertainty (the standard deviation of the 32 pattern simulations), indicating that the impact of sampling pattern choice is negligible at low CFs, where measurement noise is dominant, but grows at higher CF. The bias remains the same, whether averaged over sampling pattern or noise realization, as indicated in FIG. 7(C). The qualitative behavior shown in FIGS. 7(B) and 7(C) is expected for any gas retrievals, but the values will depend on the sample's spectral profile, noise level, compression factor, and the chosen basis. Knowing these, the bias can be simulated and corrected, if needed. In general, compressive sampling does not provide a lossless reduction in data burden and the optimal compression given the noise and sample spectral response will depend on the application.

Example 2. Recurrence Sampling

Impulse response for small molecules, after excitation by comb light, often exhibits recurring free induction decay features in the interferogram, due to periodic rephasing of the dipole moments. For regular spaced absorption lines and in the absence of centrifugal distortion or other perturbations, these recurrences are evenly spaced with an exponentially decaying amplitude due to collisions, as shown in FIG. 8(A). In free-form DCS, the presence of a particular gas can be probed by jumping the relative pulse delay to a given characteristic recurrence time, as illustrated in FIG. 8(B). The measurement rate is limited only by $f_{IF}$, which can be as high as $f_r/4$ for the in-phase and quadrature (IQ) demodulation. FIG. 8(C) shows recurrence sampling of air-broadened methane using the same 10-THz wide comb shown in FIG. 6. The relative pulse delay is jumped from $T_{RPD}$=0 ps to 6.84 ps, the second $CH_4$ recurrence in 50 ms intervals, which generates the square wave response shown in the IQ-demodulated magnitude. Perturbations common to both combs, for example due to turbulent gas flow, are corrected with the detected DC voltage before IQ demodulation. Perturbations that are not common to both combs can be normalized out by periodic sampling of the centerburst at $T_{RPD}$=0 (see FIG. 8(C)).

FIG. 8(D) compares the sensitivity of recurrence sampling to conventional DCS. Recurrence sampling reaches a given sensitivity almost a thousand times faster due to the fast update rate, here at $f_{IF}$=2.5 MHz, compared to traditional DCS which is limited to ~1 kHz update rates for 160 MHz combs by Nyquist criterion constraints. Rapid recurrence sampling is not quantitative without some calibration factor to map the demodulated signal amplitude to gas concentration. This calibration can be done via a single initial traditional DCS measurement, which would also reveal the presence of possible additional gas components. Recurrence sampling provides no selectivity against interferents. To add this capability, the recurrence sampling could be complemented by apodized sampling near the centerburst, or recurrence sampling at other $T_{RPD}$. At this level, it converges on compressive sampling using a basis set of molecular species rather than the frequency-domain basis chosen earlier.

DCS apparatus and methods in accordance with embodiments of the present invention has several advantages over conventional DCS apparatus and methods. DCS apparatus and methods in accordance with embodiments of the present invention provide: (i) dynamic and deterministic control of the relative pulse delay of two modelocked laser-based frequency combs in a spectroscopy system; (ii) dynamic and deterministic control of the relative pulse delay of any pair of phase-locked frequency combs in a spectroscopy system; (iii) the ability to dynamically transition or jump between different delays with precision and repeatability of about 10 attoseconds; (iv) the ability to increased signal-to-noise ratio and alleviated data burden by optimizing spectral resolution for the specific sample under observation, without introducing measurement dead time; (v) capability to perform hyperspectral images at an unprecedented spectral coverage with any mature comb source while adapting to fixed camera frame rate; (vi) the ability to operate at a known and constant relative pulse delay allowing for greater than 1 MHz update rate selective species detection; (vii) the ability to perform lock in detection and step scan operation with a phase-locked dual-comb system; (viii) achieve maximum photon efficiency while still probing with the whole spectral coverage (at the loss of spectral resolution); (ix) the ability to sample an uneven time grid to reduce data burden; (x) the ability to sample an uneven time grid to support machine-learning and/or classical compressed sampling techniques; and (xi) the ability to change of pulse delays without cumbersome delay lines for multi-comb or pump-probe spectroscopy.

A free-from DCS apparatus in accordance with embodiments of the present invention can scan continuously, or step the relative pulse offset, and acquire a signal at a specific $T_{RPD}$, all of which can be perform on a single DCS platform. For example, the signal to noise ratio while acquiring a signal can be optimized by adjusting the scan pattern for higher or lower spectral resolution. Compressed sampling with its non-uniform sampling could be implemented in DCS apparatus and recurrence sampling is fast and its update rate can be matched to the detector. Because the repetition rate does not constrain DCS apparatus in accordance with embodiments of the present invention, high pulse energies of low repetition rate combs can be used to achieve unparalleled spectral bandwidths from the visible region through the infrared region and into the THz region (through non-linear processes) of the electromagnetic spectrum, thereby matching FTIRs optical bandwidths.

DCS apparatus and methods in accordance with one or more embodiments of the present invention can be adapted to a variety of configurations. It is thought that DCS apparatus and methods in accordance with various embodiments of the present invention and many of its attendant advantages will be understood from the foregoing description and it will be apparent that various changes may be made without departing from the spirit and scope of the invention or sacrificing all of its material advantages, the form hereinbefore described being merely a preferred or exemplary embodiment thereof.

Those familiar with the art will understand that embodiments of the invention may be employed, for various specific purposes, without departing from the essential substance thereof. The description of any one embodiment given above is intended to illustrate an example rather than to limit the invention. This above description is not intended to indicate that any one embodiment is necessarily preferred over any other one for all purposes, or to limit the scope of the invention by describing any such embodiment, which invention scope is intended to be determined by the claims, properly construed, including all subject matter encompassed by the doctrine of equivalents as properly applied to the claims.

What is claimed is:

1. A method of dual comb spectroscopy for detecting a sample, comprising:
generating a first programmable frequency comb with a first optical pulse train, wherein the first optical pulse train is phase stabilized by applying a first phase-lock to the first programmable frequency comb at a first frequency of the first programmable frequency comb electro-magnetic spectrum and a second phase-lock to the first programmable frequency comb at a second frequency of the first programmable frequency comb electro-magnetic spectrum to a reference oscillator;
generating a second programmable frequency comb with a second optical pulse train, wherein the second optical pulse train is phase stabilized by applying a third phase-lock to the second programmable frequency comb at a third frequency of the second programmable frequency comb electro-magnetic spectrum and a fourth phase-lock to the second programmable frequency comb at a fourth frequency of the second programmable frequency comb electro-magnetic spectrum to the reference oscillator;
generating a sampling pattern comprising a sequence of a plurality of relative delays between the first optical pulse train and the second optical pulse train;
determining a first phase offset from the sampling pattern for applying to the first phase-lock of the first programmable frequency comb and a second phase offset from the sampling pattern for applying to the second phase-lock of the first programmable frequency comb;
applying at least one of the first and the second phase offsets to the first programmable frequency comb to set the sequence of the plurality of the relative delays between the first optical pulse train and the second optical pulse train;
directing at least one of the first and the second pulse trains through the sample to probe the sample;
detecting an optical output from the probed sample;
digitizing the detected optical output from the probed sample;
demodulating the digitized optical output to generate an optical field product of the first optical pulse train and the second optical pulse train, wherein the optical field product of the first and the second optical pulse trains is generated at the sequence of the plurality of the relative delays between the first optical pulse train and the second optical pulse train; and
reconstructing the demodulated digitized optical output to generate a representation of the sample response.

2. The method of claim 1, further comprising:
determining a third phase offset from the sampling pattern for applying to the third phase-lock of the second programmable frequency comb and a fourth phase offset from the sampling pattern for applying to the fourth phase-lock of the second programmable frequency comb; and
applying at least one of the third and the fourth phase offsets to the second programmable frequency comb.

3. The method of claim 1, further comprising combining the first and the second optical pulse trains to generate a combined optical pulse train.

4. The method of claim 3, wherein the directing the first and the second optical pulse trains comprises directing the combined optical pulse train though the sample to probe the sample.

5. The method of claim 1, wherein the sampling pattern is a real time apodization sampling pattern.

6. The method of claim 1, wherein the sampling pattern is a compressive sampling pattern that comprises a random and uneven sequence of a plurality of relative delays between the first optical pulse train and the second optical pulse train.

7. The method of claim 1, wherein the sampling pattern is a recurrence sampling pattern, wherein the recurrence sampling pattern adjusts the plurality of the relative time delays between the first programmable frequency comb and the second programmable frequency comb from zero to at least one of a plurality of pre-determined values.

8. The method of claim 1, wherein the representation of the sample response is a frequency domain spectrum.

9. A method of dual comb spectroscopy for detecting a sample, comprising:
   generating a first optical pulse train from a first programmable frequency comb and a second optical pulse train from a second programmable frequency comb, wherein the first and the second optical pulse trains are optically coherent with a stabilized relative pulse delay;
   determining a first carrier-envelope offset frequency for the first programmable frequency comb and a second carrier-envelope offset frequency for the second programmable frequency comb;
   applying to the first and the second carrier-envelope offset frequencies a first and a second phase-lock to a reference oscillator;
   applying to the first and the second programmable frequency combs a third and a fourth phase-locks to a common narrow linewidth single mode continuous wave laser to set the first and the second optical pulse trains from the first and second programmable frequency combs to have a fixed relative pulse delay and carrier frequency offset;
   generating compressive sampling pattern for varying the relative pulse delay between the first optical pulse train of the first programmable frequency comb and the second optical pulse train of the second programmable frequency comb for at least one of a plurality of compression factors;
   determining a first phase offset from the compressive sampling pattern for applying to the first phase-lock of the first programmable frequency comb and a second phase offset from the compressive sampling pattern for applying to the second phase-lock of the first programmable frequency comb;
   applying at least one of the first and the second phase offsets to the first programmable frequency comb to set a sequence of a plurality of relative delays between the first optical pulse train and the second optical pulse train;
   directing at least one of the first and the second pulse trains through the sample to probe the sample;
   detecting an optical output from the probed sample;
   digitizing the detected optical output from the probed sample;
   demodulating the digitized optical output to generate a signal proportional to the optical field product of the first optical pulse train and the second optical pulse train, wherein the optical field product of the first and the second optical pulse trains are generated at the plurality of the relative delay times of the compressive sampling pattern; and
   reconstructing the demodulated digitized optical output to generate a sample response spectrum.

10. The method of claim 9, further comprising:
    determining a third phase offset from the compressive sampling pattern for applying to the third phase-lock of the second programmable frequency comb and a fourth phase offset from the compressive sampling pattern for applying to the fourth phase-lock of the second programmable frequency comb; and
    applying at least one of the third and the fourth phase offsets to the second programmable frequency comb.

11. The method of claim 9, further comprising combining the first and second optical pulse trains to generate a combined optical pulse train.

12. The method of claim 11, wherein the directing the first and the second optical pulse trains comprises directing the combined optical pulse train though the sample to probe the sample.

13. A dual comb spectroscopy apparatus for detecting a sample, said apparatus comprising:
    a first programmable frequency comb configured to generate a first optical pulse train;
    a second programmable frequency comb configured to generate a second optical pulse train;
    a time programming controller configured to generate a sampling pattern comprising a sequence of a plurality of relative delays between the first optical pulse train and the second optical pulse train, wherein the time programming controller determines the plurality of the relative delays between the first optical pulse train and the second optical pulse train;
    a first common narrow linewidth single mode continuous wave laser source for referencing the first and the second programmable frequency combs;
    a first comb controller configured to phase-lock the first programmable frequency comb to the first common narrow linewidth single mode continuous wave laser source with a first phase offset and to phase-lock a carrier-envelope offset frequency of the first programmable frequency comb with a second phase offset, wherein the first comb controller adjusts at least one of the first and the second phase offsets to dynamically control the first optical pulse train timing;
    a second comb controller configured to phase-lock the second programmable frequency comb to the first common narrow linewidth single mode continuous wave laser source with a third phase offset and to phase-lock a carrier-envelope offset frequency of the second programmable frequency comb with a fourth phase offset, wherein the second comb controller adjusts at least one of the third and the fourth phase offsets to dynamically control the second optical pulse train timing;
    a sample area for receiving the sample for detection, wherein the sample area is configured to receive the first and the second optical pulse trains, wherein the sample area is configured to direct the first and the second optical pulse trains to the sample to generate an optical output;
    a detector for detecting the optical output from the sample; and
    a first processor for reconstructing the detected optical output to generate a reconstructed sample response.

14. The apparatus of claim 13, further comprising an optical combining section for combining the first optical pulse train and the second optical pulse train to generate a combined optical pulse train.

15. The apparatus of claim 14, wherein the optical combining section is positioned after the sample area.

16. The apparatus of claim 14, wherein the optical combining section is positioned before the sample area.

17. The apparatus of claim 13, further comprising:
a digitizer for digitizing the detected optical output from the sample; and
a second processor for demodulating the detected optical output to generate an optical field product of the first optical pulse train and the second optical pulse train, wherein the optical field product of the first and the second optical pulse trains are generated at the plurality of the relative delays between the first optical pulse train and the second optical pulse train.

18. The apparatus of claim 13, wherein the sampling pattern generated by the time programming controller is a real time apodization sampling pattern.

19. The apparatus of claim 13, wherein the sampling pattern generated by the time programming controller is a compressive sampling pattern.

20. The apparatus of claim 13, wherein the detector is a focal plane array camera.

21. A dual comb spectroscopy apparatus for detecting a sample, said apparatus comprising:
a first programmable frequency comb configured to generate a first optical pulse train;
a second programmable frequency comb configured to generate a second optical pulse train;
a time programming controller configured to generate a sampling pattern comprising a sequence of a plurality of relative delays between the first optical pulse train and the second optical pulse train, wherein the time programming controller determines the plurality of the relative delays between the first optical pulse train and the second optical pulse train;
a first common narrow linewidth single mode continuous wave laser source and a second common narrow linewidth single mode continuous wave laser source for referencing the first and the second programmable frequency combs;
a first comb controller configured to phase-lock the first programmable frequency comb to the first common narrow linewidth single mode continuous wave laser source with a first phase offset and to phase-lock the first programmable frequency comb to the second common narrow linewidth single mode continuous wave laser source with a second phase offset, wherein the first comb controller adjusts at least one of the first and the second phase offsets to dynamically control the first optical pulse train timing;
a second comb controller configured to phase-lock the second programmable frequency comb to the first common narrow linewidth single mode continuous wave laser source with a third phase offset and to phase-lock the second programmable frequency comb to the second common narrow linewidth single mode laser with a fourth phase offset, wherein the second comb controller adjusts at least one of the third and the fourth phase offsets to dynamically control the second optical pulse train timing;
a sample area for receiving the sample for detection, wherein the sample area is configured to receive the first and the second optical pulse trains, wherein the sample area is configured to direct the first and the second optical pulse trains to the sample to generate an optical output;
a detector for detecting the optical output from the sample; and
a first processor for reconstructing the detected optical output to generate a reconstructed sample response.

22. The apparatus of claim 21, further comprising an optical combining section for combining the first optical pulse train and the second optical pulse train to generate a combined optical pulse train.

23. The apparatus of claim 22, wherein the optical combining section is positioned after the sample area.

24. The apparatus of claim 22, wherein the optical combining section is positioned before the sample area.

25. The apparatus of claim 21, further comprising:
a digitizer for digitizing the detected optical output from the sample; and
a second processor for demodulating the detected optical output to generate an optical field product of the first optical pulse train and the second optical pulse train, wherein the optical field product of the first and the second optical pulse trains are generated at the plurality of the relative delays between the first optical pulse train and the second optical pulse train.

26. The apparatus of claim 21, wherein the sampling pattern generated by the time programming controller is a real time apodization sampling pattern.

27. The apparatus of claim 21, wherein the sampling pattern generated by the time programming controller is a compressive sampling pattern.

28. The apparatus of claim 21, wherein the detector is a focal plane array camera.

* * * * *